Patented July 4, 1933

1,916,803

UNITED STATES PATENT OFFICE

PAUL LEY AND LUDWIG TEICHMANN, OF LEVERKUSEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF SODIUM SULPHIDE

No Drawing. Application filed February 1, 1932, Serial No. 590,308, and in Germany May 6, 1929.

The present invention relates to a process for producing sodium sulphide by reducing sodium sulphate in the solid state by means of hydrogen at elevated temperatures.

The sodium sulphide customarily used in trade is crystallized and contains 30% of sodium sulphide and 70% of water. Another commercial product, the so-called "concentrated sodium sulphide" contains about 60% of sodium sulphide and up to 40% of water. These products are obtained by evaporation of sodium sulphide solutions obtained by lixiviating the crude melt normally produced by reduction of melted sulphate with carbon or with reducing carbonaceous gases. The said crude melt cannot be used in trade directly because it usually contains a considerable amount of unburned carbon or carbon separated from the carbonaceous gases, furthermore, sodium carbonate. It further takes up in the melt, from the reducing carbon and the walls of the furnace, iron and other insoluble constituents, such as, for instance, silicates. When using coal or coke as reducing agent it is known that the higher the temperature is to which the content of the furnace is exposed, the greater is the decomposition thereof. The product thus obtainable contains unused reducing carbon same as all crude melts. Therefore, a marketable product can only be obtained by lixiviating, filtering and concentrating in the usual manner.

The above named processes all require a series of individual working stages in order to produce from sodium sulphate a marketable sodium sulphide. As stated above the purified sodium sulphide contains 40-70% of water, which water, of course, only represents inert ballast which, for instance, increases the cost of freight in an undesired manner. In accordance with the process of the present invention a completely reduced pure, water- and carbon-free sodium sulphide can be obtained from sodium sulphate in only one working step. This process signifies therefore a considerable technical advance.

The process of the present invention consists in reducing sodium sulphate by means of hydrogen to sodium sulphide. The whole process is carried out in the solid phase. The state of purity of the product obtainable in accordance with this process depends on the purity of the starting material. Any melting of the material in the furnace must by all means be avoided, because the reaction takes place between about 500 and 600° C. and can be finished at about 580–620° C. with a technically efficient velocity, that is to say far below the melting point of technical sodium sulphate, which we have found to lie for the various kinds of sulphate at a temperature of about 840° C. ±20° C. The sodium sulphate used as starting material is preferably first transformed into shaped particles, for instance, granules, whereby the diffusion of the hydrogen into the interior of the mass to be reduced is facilitated. The use of the sodium sulphate in the form of shaped particles is not very important when furnaces are used wherein the material can be exposed to the hydrogen in thin layers, for instance, rotating annular furnaces. The process may, however, also be performed in any ordinary mechanical furnace without difficulty, since, as already stated, the sodium sulphate/sodium-sulphide mixture remains solid during the whole reduction process and attacks the walls of the furnace much less than in the known melting processes.

We have found that in the beginning of the reduction the sodium sulphide/sodium sulphate mixture passes through a melting point minimum which is at about 650° C. for the technical sulphate. As long as less than 70% of sodium sulphide are contained in the reaction mixture a temperature above 700° C. must be avoided so that the material in the furnace does not melt or sinter. Contrary to the known processes it is a characteristic feature of our working method that sintering and melting, even partial melting, is avoided during the reduction. As soon as the reaction mixture contains more than 70% of sodium sulphide, the melting point of the sodium sulphide/sodium sulphate mixture is raised. The reduction may, for instance, be finished with hydrogen at 1000° C. without any additions of agents diminishing the plasticity, for instance, carbon, coke, magnesium oxide, or other additions described in the literature for avoiding the melting of the mass being necessary. At these high temperatures the reaction becomes complete with great velocity, so that no $SO_4$ in the final product can be detected. From technical sulphate a product is obtained containing 97% of sodium sulphide, the rest being impurities of the sulphate. When employing sufficiently pure sodium sulphate a final product containing more than 99% of sodium sulphide can be obtained. When charging the furnace with granules, the sodium sulphide is likewise obtained in the form of granules. Such forms are preferred by the trade since they are more convenient for practical use than the crude melt or concentrated products used heretofore. Since the weight can be brought up to about 1 ton of sodium sulphide for each cubic meter, remarkable savings in freight can be made in comparison with products produced in accordance with the known processes, inasmuch as 1 ton of the products heretofore in use, containing only up to 60% of sodium sulphide, likewise occupies a volume of about 1 c. m.

It is possible to accelerate the reduction process by the addition of catalysts, such as iron compounds, for instance, iron oxide, iron sulphide and iron sulphate.

The invention is illustrated by the following example without being restricted thereto:

*Example*

In a rotary furnace granulated sodium sulphate containing 98.5% of $Na_2SO_4$ is exposed to a current of hydrogen having a temperature of 950° C., which enters the furnace at one end and leaves it at a temperature of 500° C. The granules which before entering the furnace are preheated to about 500° C. pass through the furnace in about 6 hours. At the end of the furnace a product is obtained containing about 97% of $Na_2S$ and 0.15% of Fe (originating from the sulphate). The solid material runs through the furnace in counter-current to the hydrogen. The hydrogen leaving the furnace is freed from the reaction water by cooling for instance to about 20° C. and is then re-introduced into the process after heating to 950° C.

This is a continuation in part of our copending application Serial No. 447,767, filed April 26, 1930.

We claim:—

1. Process for preparing anhydrous, carbon-free sodium sulphide, comprising reducing sodium sulphate by means of hydrogen and performing the whole reduction process in the solid phase.

2. Process for preparing anhydrous, carbon-free sodium sulphide, comprising reducing sodium sulphate by means of hydrogen firstly at a temperature of 500–620° C. until about 15% of the sodium sulphate is reduced, then reducing the remaining sodium sulphate at a temperature of about 620–700° C. until about 70% of the sodium sulphate is reduced, and then continuing the reducing treatment of the residual sulphate at a temperature up to 1000° C.

3. Process for preparing anhydrous, carbon-free sodium sulphide, comprising reducing sodium sulphate by means of hydrogen in a rotating tube furnace firstly at a temperature of 500–620° C. until about 15% of the sodium sulphate is reduced, then reducing the remaining sodium sulphate at a temperature of about 620–700° C. until about 70% of the sodium sulphate is reduced, and then continuing the reducing treatment of the residual sulphate at a temperature up to 1000° C.

4. Process for preparing anhydrous, carbon-free sodium sulphide, comprising reducing granulated sodium sulphate by means of hydrogen in a rotating tube furnace firstly at a temperature of 500–620° C. until about 15% of the sodium sulphate is reduced, then reducing the remaining sodium sulphate at a temperature of about 620–700° C. until about 70% of the sodium sulphate is reduced, and then continuing the reducing treatment of the residual sulphate at a temperature up to 1000° C.

5. Process for preparing anhydrous, carbon-free sodium sulphide, comprising reducing sodium sulphate by means of hydrogen in a rotating tube furnace in such a manner that the hydrogen is introduced into the furnace at the one end with a temperature of about 950° C. and the sodium sulphate is introduced into the furnace at the other end of the furnace with a temperature of about 500° C.

6. Process for preparing anhydrous, carbon-free sodium sulphide, comprising reducing granulated sodium sulphate by means of hydrogen in a rotating tube furnace in such a manner that the hydrogen is introduced into the furnace at the one end with a temperature of about 950° C. and the sodium sulphate is introduced into the furnace at the other end of the furnace with a temperature of about 500° C.

7. Process as claimed in claim 1 in the presence of an iron compound.

8. Process as claimed in claim 2 in the presence of an iron compound.

9. Process as claimed in claim 3 in the presence of an iron compound.

10. Process as claimed in claim 4 in the presence of an iron compound.

11. Process as claimed in claim 5 in the presence of an iron compound.

12. Process as claimed in claim 6 in the presence of an iron compound.

In testimony whereof, we affix our signatures.

PAUL LEY.
LUDWIG TEICHMANN.